(No Model.)
J. BELTZER.
WASHING MACHINE.
No. 517,537. Patented Apr. 3, 1894.
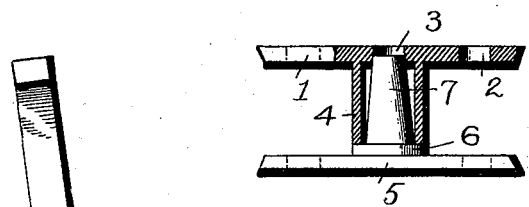
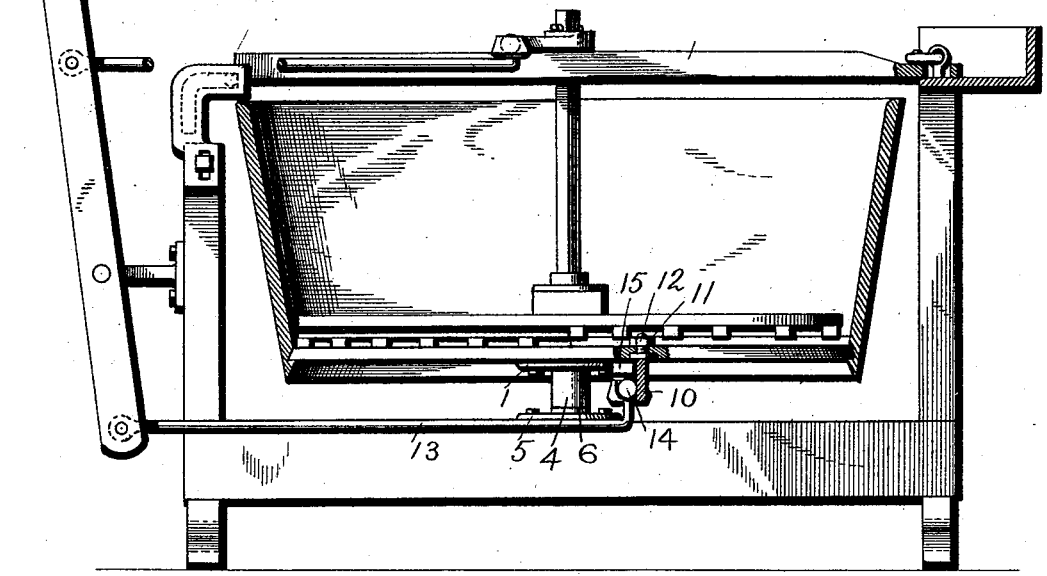
Witnesses
Albert Speiden
J. F. Culverwell
Inventor
Joseph Beltzer,
By Attorneys
Finckel & Finckel.

UNITED STATES PATENT OFFICE.

JOSEPH BELTZER, OF COLUMBUS, OHIO, ASSIGNOR TO JAMES H. BUTLER, OF SAME PLACE.

WASHING-MACHINE.

SPECIFICATION forming part of Letters Patent No. 517,537, dated April 3, 1894.

Application filed January 23, 1893. Serial No. 459,310. (No model.)

*To all whom it may concern:*

Be it known that I, JOSEPH BELTZER, a citizen of the United States, residing at Columbus, in the county of Franklin and State of Ohio, have invented certain new and useful Improvements in Washing-Machines; and I do hereby declare the following to be a full, clear, and exact description of the invention, such as will enable others skilled in the art to which it appertains to make and use the same.

My invention consists of improvements in that class of washing machines an example of which may be seen in the patent of John E. Mitchell, No. 281,111, dated July 10, 1883. For the instruction of those who cannot conveniently consult this patent I will say that washing machines of this kind comprise a tub having rubbing bars on its bottom pivoted in a frame, a disk-like rubber that stands horizontally in the tub, and means for oscillating the tub and rubber horizontally in contrary directions. In machines of this kind it is of the utmost importance that the parts may be readily assembled and that the moving parts operate with the least friction possible.

My improvements are directed to these ends, as hereinafter shown, described, and claimed.

In the accompanying drawings, Figure 1 is a vertical sectional view of a machine illustrating the improved pivot, and the joint or connection of the pitman. Fig. 2 is an enlarged sectional view of the pivot.

Like characters in the different figures indicate corresponding parts.

1 designates a plate that is fastened to the tub by screws passing into the bottom of the tub through elongated holes 2 in the plate. The plate 1 is made with a tapering bearing 3 and is provided on its under side with a cylindrical tube 4. 5 designates a plate similar to plate 1 that is fastened to the platform by means of screws. The plate 5 has a shoulder 6 constituting a bearing for the tube 4 and a tapering spindle 7, the upper end of which projects into the bearing hole 3. As the tube wears down on the shoulder the spindle wears up into its socket or bearing and the wearing affects not the proper fitting of the parts.

10 designates a socket piece that receives a ball 14 on the end of the pitman 13. This socket piece is made with a threaded shank 11 to receive a nut 12 that secures it in the bottom of the tub. In order that the pitman may be readily detached from the tub there must be space between the socket piece and the bottom of the tub to permit the removal when desired of the ball out of its seat; and to prevent its accidental displacement I provide a button 15 that turns on the shank of a screw in the bottom of the tub near the socket piece so that said button may be turned around into the space between the ball and bottom of the tub and lock said ball in place. It will thus be readily seen from the foregoing that the parts of my machine may be quickly separated or put together, and that the friction between the parts is reduced to a minimum.

What I claim, and desire to secure by Letters Patent, is—

In a washing machine, the combination of a plate 1 having a bearing hole 3 and cylindrical tube 4, and a plate 5 having a shoulder 6 to receive the lower end of the tube 4 and a spindle 7 the upper end of which fits in the bearing hole 3, substantially as described.

In testimony whereof I affix my signature in presence of two witnesses.

JOSEPH BELTZER.

Witnesses:
   E. O. RICKETTS,
   GEO. M. FINCKEL.